(12) United States Patent
Narayanan (10) Patent No.: US 9,197,702 B2
(45) Date of Patent: Nov. 24, 2015

(54) SYSTEM FOR AND METHOD FOR MEDIA UPLOAD MULTITHREADING FOR LARGE FILE UPLOADS (71) Applicant: Cellco Partnership, Basking Ridge, NJ (US)

(72) Inventor: Ajay Narayanan, Basking Ridge, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 171 days.

(21) Appl. No.: 14/099,473

(22) Filed: Dec. 6, 2013

(65) Prior Publication Data
US 2015/0163301 A1 Jun. 11, 2015

(51) Int. Cl.
*G06F 15/16* (2006.01)
*H04L 29/08* (2006.01)

(52) U.S. Cl.
CPC ................................ *H04L 67/1095* (2013.01)

(58) Field of Classification Search
CPC . H04L 29/08; H04L 67/1095; H04L 67/1097; G06F 17/30
USPC .................... 709/205, 219, 232, 234; 707/692
See application file for complete search history.

(56) References Cited

U.S. PATENT DOCUMENTS

| | | | | |
|---|---|---|---|---|
| 8,473,585 | B1 * | 6/2013 | Smith et al. | 709/219 |
| 2012/0054362 | A1 * | 3/2012 | Tsao et al. | 709/232 |
| 2013/0232233 | A1 * | 9/2013 | Reza | 709/219 |
| 2014/0317060 | A1 * | 10/2014 | Shen et al. | 707/652 |
| 2015/0058301 | A1 * | 2/2015 | Kolodner et al. | 707/692 |

* cited by examiner

*Primary Examiner* — Frantz Jean (57) ABSTRACT

Exemplary embodiments provide a system and method for uploading large files to a remote server faster. The system and method divide the file into smaller file chunks and utilize parallel thread execution to prepare and upload the file chunks to the remote server. The uploading may further utilize a plurality of HTTP connections. Once all chunks have been uploaded to the remote server, the chunks may be consolidated into the original file by using content tokens and chunk numbers associated with the uploaded chunks.

20 Claims, 3 Drawing Sheets

SYSTEM FOR AND METHOD FOR MEDIA UPLOAD MULTITHREADING FOR LARGE FILE UPLOADS

BACKGROUND INFORMATION

Many Internet-based applications allow users to upload content to the application server, such as a cloud application server. These files may include large files that may require a significant portion of time to upload. Existing products to prepare large file uploads may break down a larger file into smaller chunks and upload each smaller chunks sequentially. The smaller chunks may be chunks representing bytes of the larger file. Once uploaded, the full larger file may be reassembled from the smaller chunks that have been uploaded. While this solution saves some time, it still does not create an efficient process for uploading large files.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which.

DETAILED DESCRIPTION OF PREFERRED EMBODIMENTS

According to exemplary embodiments, systems and methods may provide a multithreading approach to large file uploads. The system may include a sending device and a receiving server, where the device and server are connected over a network. The sending device or the receiving server may allow for alteration of the number of parallel HTTP connections between the sending device and the receiving server. Once the number of parallel HTTP connections is set, a file at the sending device may be prepared for uploading to a receiving server. In preparation for upload, the sending device may determine a maximum upload chunk size associated with the upload. A maximum chunk size may be a predetermined variable or it may be calculated based on a variety of factors, including, but not limited to, network speed, sending server memory, and bandwidth. The maximum chunk size may also be dynamically calculated as network speed, sending server memory, and bandwidth fluctuate during the upload process.

Once the maximum chunk size is determined, the upload file may be broken down into multiple smaller chunks. The smaller chunks may be no more than the determined maximum chunk size. The sending device may determine a maximum number of allowable threads for communicating with the receiving server. This maximum number of threads may be predetermined by the receiving server or sending device or it may be dynamically calculated. The sending device may then invoke separate threads in parallel, where the media file may be read into a byte buffer array having the size of the maximum chunk size to produce a smaller chunk. When each thread is invoked, a checksum may be computed by the sending server from a byte buffer array to provide a check to the receiving server and determine whether the smaller chunk was correctly received by verifying the checksum the receiving server calculates from the chunk received.

Each smaller chunk may be processed for uploading using a parallel thread execution that passes a chunk number, which provides order data for the smaller chunk, a byte buffer, and a checksum to thread executor. Each thread generated may then upload the chunk byte array, chunk number, and checksum to the receiving server via an application programming interface ("API"), such as a representational state transfer ("REST") API, web service provided by the receiving server and one of the HTTP connections.

Once a chunk byte array, chunk number, and checksum is received at the receiving server, the receiving server may use the checksum to verify that the chunk byte array has been received correctly by computing its own checksum from the received byte array and cross-verifying that checksum with the checksum received from the sending server. The receiving server may then transmit a content token to the sending device via the API. Upon receiving the content token, the sending device may store the content token along with a chunk number in a tree map. The content token will ensure that the chunk number associated with the content token is for the correct media file, and the chunk number will provide information relating to the order associated with the uploaded chunk having the associated content token.

After the sending device obtains a content token indicating another chunk has been uploaded, the sending device may check to see if all the file chunks have been uploaded. Assuming all file chunks have been uploaded, the sending device may execute a finalize command. The finalize command may utilize the tree map created during the upload to transmit the content tokens from the tree map in the order of the chunk numbers associated with the content tokens to the receiving server via the REST API. In this manner, the receiving server receives the ordered content tokens and using the content tokens organizes the received chunks and assembles the organized chunks into the full media file for storage on the receiving server.

In the following figures, specifically FIGS. 1 and 2, while a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. For example, some of the modules or functionality associated with the modules may be supported by a separate application or platform. Other implementations and architectures may be realized.

The description below describes network elements, computers, and components of exemplary embodiments. The elements depicted may be modules of a single larger element. Each of these elements may also include one or more modules. As used herein, the term "module" may be understood to refer to computer implemented executable software, firmware, hardware, and various combinations thereof. Modules however are not to be interpreted as software which is not implemented on hardware, firmware, or recorded on a processor readable recordable storage medium (i.e., modules are not software per se). It is noted that the modules are exemplary. The modules may be combined, integrated, separated, and duplicated to support various applications. Also, a function described herein as being performed at a particular module may be performed at one or more other modules and by one or more other devices instead of or in addition to the function performed at the particular module. Further, the modules may be implemented across multiple devices and other components local or remote to one another. Additionally, the modules may be moved from one device and added to another device, and may be included in both devices.

Exemplary embodiments may include software that is installed on computer hardware to allow the execution of instructions to implement the methods described herein. The software may be tangibly embodied in one or more non-transitory physical media, such as, but not limited to, a compact disc ("CD"), a digital versatile disc ("DVD"), a floppy disk, a hard drive, read only memory ("ROM"), random access memory ("RAM"), and other physical media capable of storing software, or combinations of different media.

Moreover, the figures illustrate various components (e.g., servers, computers, etc.) separately. The functions described as being performed at various components may be performed at other components, and the various components may be combined or separated. Other modifications also may be made.

Figure 1:
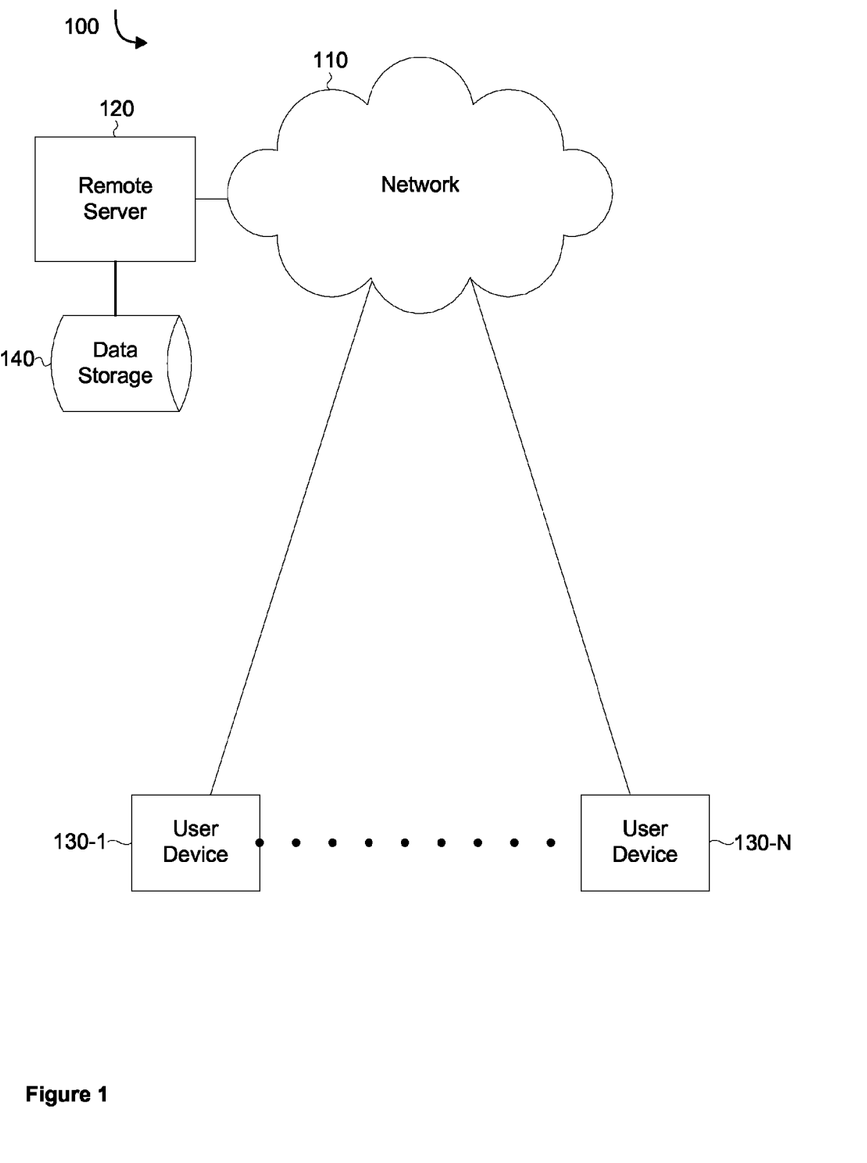
FIG. 1 depicts a system for media upload multithreading for large file uploads.

FIG. 1 is a system according to an exemplary embodiment. The system 100 may have a number of components. The components may include a remote server 120 that may receive and store data uploaded from a user device 130. The components of the system 100 may be communicatively coupled through a network 110. It should be appreciated that while exemplary interconnections between the components of the system 100 are depicted in FIG. 1, other interconnections are possible and the various components may be directly connected. The system 100 may be associated with an entity or components of the entity. For example, the entity may be a corporation such as a file hosting service provider or a telecommunications provider. In other embodiments, the system 100 may be associated with more than one entity. These entities may be related to each other. For example the entities may be legally related, such as a holding company and a subsidiary, or related through another agreement, such as a joint research agreement.

The system 100 may have a number of user devices 130-1 to 130-N and a remote server 120 connected over network 110. User devices 130-1 to 130-N and remote server 120 may be computing devices. It should be appreciated that while two user devices 130 and one remote server 120 are depicted in the system 100, there may be more or less user devices and/or remote servers. Each of the devices 130 and the remote server 120 may include one or more processors for recording, transmitting, receiving, and storing data. The devices 130 and the remote server 120 may each be single type of computing platform or the devices 130 and remote server 120 may be a mix of computing platforms. For example, the devices 130 may be a combination of portable and desktop computing devices such as tablet computing devices, smart phones, and personal computers. The devices 130 and the remote server 120 may support different operating systems.

The devices 130 may include a processor, memory, input/output (I/O), storage, and display. The processor may be a single processor or may be more than one processor. The processor may be local to the device 130 or it may be remotely located, such as used in cloud based computing. A combination of local and remote processing may be used. The memory may be transient type memory, such as Random Access Memory (RAM). The storage may utilize a redundant array of inexpensive disks ("RAID"), tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), or other computer accessible storage. In some embodiments the memory and the storage may be combined. The I/O may include communications connectively both external and internal to the device 130. The I/O may include one or more connections for communicatively coupling to one or more other computing devices, components thereof, and/or computer based networks. For example, I/O may be communicatively coupled to transmit and receive data over the network 110. The I/O may include input devices for interaction with the device 130. The display may include one or more displays coupled to the device 130. The display may be local or remote to the device 130. The display may be used to display data and/or graphical user interfaces as described herein.

The remote server 120 may be communicatively coupled to the network 110. The server 120 may be a single server or multiple servers. The server 120 may have one or more computer processors as well as data storage associated therewith. The data storage may be network accessible storage and may be local, remote, or a combination thereof. The data storage may utilize a redundant array of inexpensive disks ("RAID"), tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), or other computer accessible storage. In one or more embodiments, the data storage may be a database, such as an Oracle database, a Microsoft SQL Server database, a DB2 database, a MySQL database, a Sybase database, an object oriented database, a hierarchical database, or other database. The data storage may utilize flat file structures for storage of data.

The data storage of remote server 120 may include a database 140. Database 140 may be singular or multiple databases and may include a certain type of database, such as an Oracle database, a Microsoft SQL Server database, a DB2 database, a MySQL database, a Sybase database, an object oriented database, a hierarchical database, or other database. The data storage 140 may utilize flat file structures for storage of data. Database 140 may represent a data warehouse system that serves as a data repository for the remote server. It should be appreciated that the server 120 may be communicatively coupled to the database 140 directly. For example, the server 120 may be communicatively coupled to the database 140 using one or more enterprise serial buses. The database 140 may be communicatively to other systems not shown in FIG. 1. The databases may not communicate with one another in normal operation. The data contained in each database may be accessed separately in each database. For example, the databases may contain data that is accessed through separate systems in normal operation and may be in different formats; therefore, in order to view such data it may be normally required to access each database separately.

The devices 130 and the remote server 120 may be access points for users to access the system 100. Each of the devices 130 may be geographically separated. The devices 130 may each be communicatively coupled to the network 110. The network 110 may be a computer-based network. The network 110 may communicatively couple the various components of the system 100. The network 110 may be one or more of a wireless network, a wired network, or a combination of wireless networks and wired networks. For example, the network 110 may include one or more of a fiber optics network, a passive optical network, a cable network, an Internet network, a satellite network (e.g., operating in Band C, Band Ku or Band Ka), a wireless LAN, a Global System for Mobile Communication ("GSM"), a LTE-based network, a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11g or any other wired or wireless network for transmitting and receiving a data signal. In addition, the network 110 may include, without limitation, telephone line, fiber optics, IEEE Ethernet 802.3, a Wide Area Network ("WAN"), a Local Area Network ("LAN"), or a global network such as the Internet. The network 110 may further include one, or any number of the exemplary types of networks mentioned above operating as a stand-alone network or in cooperation with each other. Although the network 110 depicted in FIG. 1 is depicted as a single network, it should be appreciated that according to one or more embodiments, the network may be a plurality of interconnected networks, such as, for example, a service provider network, the Internet, a broadcaster's network, a cable television network, a corporate network, and a home network. The network 110 may have multiple access points.

In the network 110, data may be transmitted and received utilizing a standard telecommunications protocol or a standard networking protocol. For example, data may be transmitted and received using Wireless Application Protocol ("WAP"), Multimedia Messaging Service ("MMS"), Enhanced Messaging Service ("EMS"), Short Message Service ("SMS"), Global System for Mobile Communications ("GSM")-based systems, LTE-based systems, Code Division Multiple Access ("CDMA")-based systems, Transmission Control Protocol/Internet ("TCP/IP") Protocols, or other protocols and systems suitable for transmitting and receiving broadcast data. Data may be transmitted and received wirelessly or may utilize cabled network or telecom connections such as an Ethernet RJ45/Category 5 Ethernet connection, a fiber connection, a traditional phone wireline connection, a cable connection or other wired network connection. For example, the network 110 may use standard wireless protocols such as, for example, IEEE 802.11a, 802.11b 802.11g, and 802.11n. The network 110 may also use protocols for a wired connection, such as IEEE Ethernet 802.3. In some embodiments, the network 110 may utilize one or more protocols of one or more network elements to which it is communicatively coupled. The network 110 may translate to or from other protocols to one or more protocols of network devices.

Figure 2:
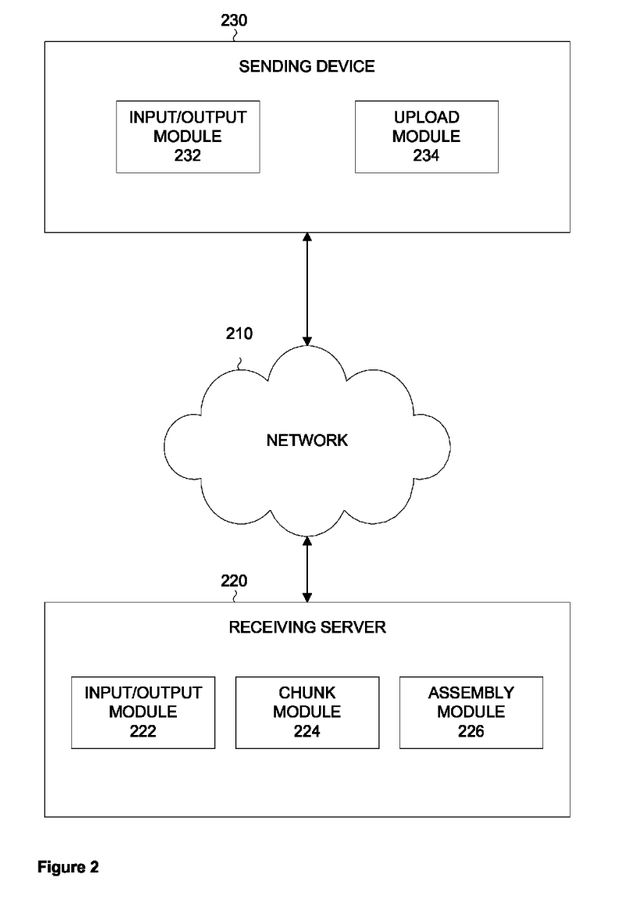
FIG. 2 depicts a system for media upload multithreading for large file uploads.

FIG. 2 is a block diagram of hardware components of a system according to an exemplary embodiment. Illustrated in FIG. 2 are various components including an exemplary sending device 230 and an exemplary receiving server 220. The components of FIG. 2 may be connected over a network as illustrated in FIG. 1 and may correspond to the sending user devices 130 and remote server 120. Moreover, data may be transmitted and received on the sending device 230 and receiving server 220 wirelessly or may utilize cabled network or telecom connections such as an Ethernet RJ45/Category 5 Ethernet connection, a fiber connection, a traditional phone wireline connection, a cable connection or other wired network connection. Network 210 may use standard wireless protocols including IEEE 802.11a, 802.11b and 802.11g. Network 210 may also use protocols for a wired connection, such as an IEEE Ethernet 802.3.

As used herein, the term "module" may be understood to refer to computer executable software, firmware, hardware, or various combinations thereof. It is noted that the modules are exemplary. The modules may be combined, integrated, separated, or duplicated to support various applications. Also, a function described herein as being performed at a particular module may be performed at one or more other modules and by one or more other devices instead of or in addition to the function performed at the particular module. Further, the modules may be implemented across multiple devices or other components local or remote to one another. Additionally, the modules may be moved from one device and added to another device, or may be included in both devices.

The sending device 230 may include an input/output module 232 for sending and receiving data and an upload module 234 for carrying out functions to enable uploading large files to a remote receiving server 220. The input/output module 234 may include various hardware and software components, such as, for example, a repeater, a microwave antenna, a cellular tower, or another network access device capable of providing connectivity between network mediums. The input/output module 232 may be capable of sending or receiving signals via network 210. Moreover, the input/output module 232 may provide connectivity to one or more wired networks and may be capable of receiving signals on one medium such as a wired network and transmitting the received signals on a second medium such as a wireless network. The upload module 234 may include various hardware and software components, such as for example one or more processors capable of executing functions to enable the uploading of large files to a remote receiving server 220 via network 210 as described below with reference to FIG. 3.

The receiving server 220 may include an input/output module 222 for sending and receiving data, a chunk module 224 for managing uploaded file chunks and related data, and an assembly module 226 for assembling uploaded file chunks in preparation for storage at the receiving server 220 or a data storage connectively coupled to the receiving server 220 (not shown). The input/output module 222 may include various hardware and software components, such as, for example, a repeater, a microwave antenna, a cellular tower, or another network access device capable of providing connectivity between network mediums. The input/output module 222 may be capable of sending and/or receiving signals via network 210. Moreover, the input/output module 222 may provide connectivity to one or more wired networks and may be capable of receiving signals on one medium such as a wired network and transmitting the received signals on a second medium such as a wireless network. The chunk module 224 may include various hardware and software components, such as, for example, a processor, configured to manage uploaded file chunks and data associated with the uploaded file chunks. The assembly module 226 may include various hardware and software components, such as, for example, a processor, configured to assemble file chunks into a complete file and prepare the completed file for storage.

Figure 3:
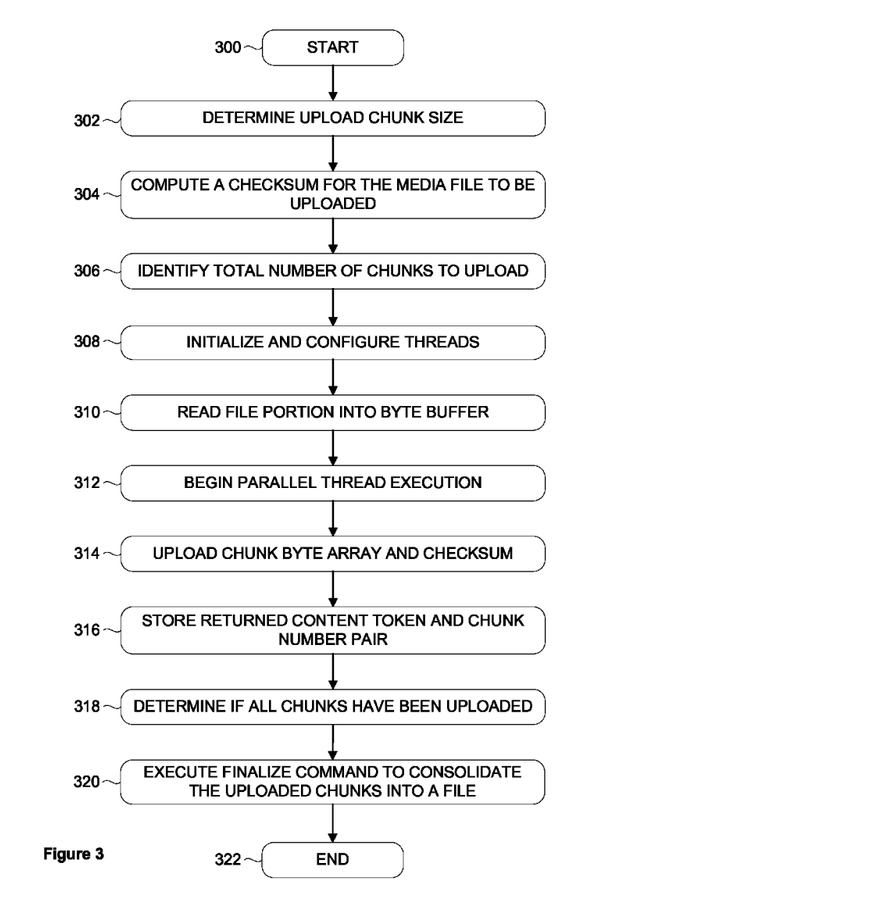
FIG. 3 depicts a method for media upload multithreading for large file uploads.

FIG. 3 is a method according to exemplary embodiments. Exemplary method, which begins at step 300, is provided by way of example, as there are a variety of ways to carry out the methods disclosed herein. The method as shown in FIG. 3 may be executed or otherwise performed by one or a combination of various systems, such as a computer implemented system. For example, the systems 100 and 200 may be used to implement the method 300. Each block shown in FIG. 3 represents one or more processes, methods, and/or subroutines carried out in the exemplary method. Each block may have an associated processing machine or the blocks depicted may be carried out through one processor machine.

At block 302, a sending device may determine an upload chunk size. And upload chunk size may include a portion of the total size of a file to be uploaded. In an exemplary embodiment, the sending device may break a file to be uploaded into smaller chunks of bytes the size of the determined upload chunk size. An upload chunk size may be a predetermined size, or it may be dynamically calculated. For example, a dynamically calculated chunk size may be determined based on bandwidth, available memory associated with the sending device, network speed, and/or sending device system specifications. Upload chunk size may be set and unaltered throughout the upload process or the upload chunk size may vary during the upload process to provide an optimized uploading process.

Once the upload chunk size is determined, a checksum may be computed for the media file to be uploaded (block 304). A checksum may be sent from the sending device to the receiving server to query the receiving server and determine whether the file already exists on the receiving server-side. A checksum may be computed using a checksum algorithm, such as a parity check algorithm, a modular sum algorithm, a position-dependent algorithm, or any other checksum algorithm, to determine whether the file to be uploaded from the sending device already exists on the receiving server.

At block 306, the total number of chunks to be uploaded may be calculated. The total number of chunks to upload may be calculated by dividing the total file size by the calculated upload chunk size rounded up to the nearest integer. The total number of chunks may be variably calculated throughout the upload when the upload chunk size is variably calculated throughout the upload process. Once the number of chunks to be uploaded has been calculated, the upload process may begin.

At block 308, the sending device may initialize and configure a number of allowable threads and initialize a number of HTTP connections to the receiving server. A thread pool executor may execute each submitted task using one of many threads from a preconfigured pool of threads. A submitted tasks in this method 300 may include preparing a chunk for upload, computing its checksum, and uploading the prepared chunk. The number of threads in the thread pool may be configured to be twice the number of HTTP connections used for uploading so that while one set of threads, after uploading, waits for a response from the receiving server, another set of threads may prepare the next set of byte chunks to be uploaded. The number of threads in a thread pool may be a set number or may be dynamically calculated based on a variety of factors including sending device memory parameters, network speed, and/or available bandwidth. Similarly, the number of HTTP connections may be a predetermined value or may be dynamically calculated based on a variety of factors including sending device memory parameters, network speed, and/or available bandwidth.

Once the threads and HTTP connections have been initialized and configured, the system may begin the upload process by reading a portion of the file to be uploaded into a byte buffer array (block 310). The byte buffer array may be of a size consistent with the upload chunk size. In addition to reading a portion of the file to be uploaded into a byte buffer array, a checksum may be computed for the data held in the byte buffer array. The checksum computed for each chunk loaded may provide the receiving server with a way to verify that the chunk of bytes received is correct.

At block 312, parallel thread execution may begin. During parallel thread execution, a chunk number, the byte buffer array, and checksum may be passed to the receiving server via an open thread. While a set of threads is executing the upload process, another set of threads may also be executing to prepare the next set of byte chunks for uploading. For example, during the upload process of one chunk, another chunk may be prepared for upload, such as described in block 310. At block 314, the chunks that have been prepared for upload may be uploaded to the receiving server using an available HTTP connection to the receiving server. Communication between the sending device and the receiving server may be facilitated by an API, such as a REST API, that specifies how the sending device and the receiving server may communicate with one another.

At block 316, the sending device may receive a content token as a response to a completed upload of a chunk from the receiving server for the chunk number it sent. The response also may include data, such as a checksum and a chunk size, which may be included in a content token. The content token and chunk number pair may be stored with the sending device in a tree map linking the chunk number and content token. For example, the sending device may read in the content token and chunk number and read the pair into a binary search tree structure for storage. In this manner, each chunk may be stored as related to the uploaded file on the receiving server and each chunk number and content token may be stored for each chunk on the sending device.

A tree map may include a data structure, such as a hierarchical data structure, that may store data sets in a particular order. For example, a tree map may store chunk bytes associated with a particular file in one tree map, where each branch of the tree map stores a data set including, for example, the content token and the chunk number. Alternative data structures may be used, where the data structure allows the data to be ordered and organized according to the file the chunk bytes are associated with. By way of example a tree map may include, for example, a binary search tree map. Other data structures may be used to store the content token, chunk number pair, such as other map data structures that receive a {key, value} pair such as a {chunk number, content token} pair. Exemplary map data structures may automatically order received data based on the key value and maintain a searchable data structure for the value when given the key.

At block 318, the sending device may determine if all chunks have been uploaded. Where chunk size is dynamically calculated, the sending server may determine this by comparing the total size of the uploaded chunks to the total file size before the file was broken into chunks. Alternatively, where chunk size is locked once calculated or manually set, the sending device may determine if all chunks have been uploaded by comparing the number of uploaded chunks to the number of chunks identified in block 306.

If it is determined that not all chunks have been uploaded, the sending device may continue to execute parallel threads for chunk uploading and storing of the returned content token and chunk number pair. If it is determined that all chunks have been uploaded, in block 320, the sending device may execute a finalize command to facilitate consolidation of the uploaded chunks into one file on the receiving server-side. For example the finalize command may pass the stored content tokens from the tree map in an order according to the chunk number associated with the content token. The file checksum also may be passed along with the content token so that the receiving server can cross verify the file it generates at the end of the upload process. Once a chunk has been located, it may be placed in order along with the other chunks based on the ordering of the content tokens sent by the sending device. Once all chunks have been consolidated in the appropriate order into a single file on the receiving server, a checksum is calculated for the file generated and compared with the checksum for the file sent by the sending device to verify that the file has been successfully regenerated on the receiving server. The file may be stored on the receiving server and the method may end at block 322. The file may be stored locally with the receiving server or remotely in data storage associated with the receiving server.

By way of example, a 25 MB file may be a large file to be uploaded using the disclosed system. An upload chunk size may be determined to be 3 MB based on bandwidth, available memory associated with the sending device, network speed, and sending device system specifications. For example, a higher bandwidth may increase the upload chunk size, a larger available memory associated with the sending device may increase the upload chunk size, and a faster network speed may increase the upload chunk size. Other sending server specifications may increase the upload chunk size, such as processing speed and operating system version. A checksum may then be computed using the 25 MB file. This checksum may be transmitted to the receiving server and compared to other checksums for files stored with the receiving server to determine if the file already exists on the receiving server. Assuming the 25 MB file does not already exist on the receiving server, the receiving server may transmit a response alerting the sending server that the 25 MB file does not exist. The sending server may then calculate a total number of chunks to upload. In this example, since the file size is 25 MB and the chunk size is 3 MB, the total number of chunks to upload will be 9 chunks (25 MB/3 MB=8.333, rounded to the nearest integer is 9). The sending server may then determine a number of available HTTP connections. For example, the sending server may determine that there are five available HTTP connections. Accordingly, the sending server may initialize ten threads to carry out parallel thread execution (double the available HTTP connections).

For example, in proceeding with parallel thread execution, a first chunk may be read into a byte buffer array of size 5 MB, assigned a chunk number, and receive a computed checksum to associate with the byte buffer array. This process may be carried out for each chunk as it is prepared for upload. In parallel thread execution, the first five threads associated with five open HTTP connections may pass the chunk number, byte buffer array, and checksum to the HTTP connection for upload. In parallel, the other five available threads may be preparing the next five chunks for upload by reading the chunks into a byte buffer array, calculating a checksum, and assigning a chunk number. Once an HTTP connection becomes available a next prepared chunk (including byte buffer array, chunk number, and checksum) may be uploaded. In response to each uploaded chunk, the receiving server may generate a content token, which may include a checksum, and transmit the content token and associated chunk number to the sending server. The receiving server may also compare the checksum received with each byte buffer array with a checksum calculated at the receiving server to ensure that each received chunk has not been altered or corrupted. The sending server may then store each received content token, chunk number pair in a tree map according to the chunk number, such as a binary search tree, in order to recall each content token, chunk number pair in the order by chunk number. Once all chunks have been uploaded, the sending server may call a finalize command that traverse the tree map to transmit each content token, chunk number pair in order or chunk number and the file checksum. The sending server may transmit each content token in order of chunk number to the receiving server so that the receiving server may reassemble the chunks in the order of chunk number based on the received content token. The receiving server then computes a checksum for the reassembled file and cross verifies the computed checksum with the checksum sent by the sending device to ensure completeness of the file.

In the preceding specification, various preferred embodiments have been described with references to the accompanying drawings. It will, however, be evident that various modifications and changes may be made thereto, and additional embodiments may be implemented, without departing from the broader scope of invention as set forth in the claims that follow. The specification and drawings are accordingly to be regarded in an illustrative rather than restrictive sense.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A system, comprising:
    a processor; and
    a memory comprising computer-readable instructions which when executed by the processor cause the processor to:
        receive a file having a size property;
        determine a maximum upload chunk size for the file;
        identify a total number of file chunks to upload based on the file size property and the maximum upload chunk size;
        configure a maximum number of allowable threads and a maximum number of HTTP connections;
        read a portion of the file into a byte buffer array having a size equal to the maximum upload chunk size;
        pass a chunk number, the byte buffer array, and a chunk checksum into one thread associated with the maximum number of allowable threads for upload execution;
        upload the chunk number, the byte buffer array, and the chunk checksum using one HTTP connection of the maximum number of HTTP connections;
        receive, via a network, a content token returned by a receiving server after the byte buffer array, the chunk number, and the chunk checksum have been received at the receiving server;
        store the received content token along with the chunk number as a pair;
        determine whether the total number of file chunks have been uploaded; and
        when the total number of file chunks have been uploaded, pass all stored content tokens in an order of chunk number and a file checksum to the receiving server for file consolidation.

2. The system of claim 1, wherein the maximum upload chunk size is determined based on at least one of: a network speed, an available bandwidth, or a system memory availability.

3. The system of claim 1, wherein the maximum number of allowable threads is determined based on at least one of: a network speed, an available bandwidth, or a system memory availability.

4. The system of claim 1, wherein the maximum number of HTTP connections is determined based on at least one of: a network speed, an available bandwidth, or a system memory availability.

5. The system of claim 1, wherein the content token is passed to the receiving server in the order of chunk number and a file checksum.

6. The system of claim 1, wherein the processor is further to:
    compute a file checksum based on the file before configuring the maximum number of allowable threads and the maximum number of HTTP connections, and
    wherein the checksum is transmitted to the receiving server to determine whether the file already exists on the receiving server and whether file consolidation generates a complete file of reassembled file chunks.

7. The system of claim 1, wherein the passing of the chunk number, the byte buffer array, and the chunk checksum into one thread associated with the maximum number of allowable threads for upload execution occurs a plurality of times in parallel so that each of the maximum number of allowable threads is utilized in parallel.

8. The system of claim 1, wherein the uploading of the a chunk number, the byte buffer array, and the checksum using one HTTP connection of the maximum number of HTTP connections occurs a plurality of times in parallel so that each of the maximum number of HTTP connections is utilized in parallel.

9. The system of claim 1, wherein the maximum number of allowable threads is double the maximum number of available HTTP connections.

10. The system of claim 9, wherein the maximum number of allowable threads includes at least two sets of threads, where one set, of the at least two sets, is preparing data for upload while the another set, of the at least two sets, is uploading previously prepared data.

11. A method, comprising:
    receiving, on a sending device having at least one processor, a file having a size property;
    determining, on the sending device, a maximum upload chunk size for the file;
    identifying, on the sending device, a total number of file chunks to upload based on the file size property and the maximum upload chunk size;
    configuring, on the sending device, a maximum number of allowable threads and a maximum number of HTTP connections;
    reading, by the sending device, a portion of the file into a byte buffer array having a size equal to the maximum upload chunk size;
    passing, by the sending device, a chunk number, the byte buffer array, and a chunk checksum into one thread associated with the maximum number of allowable threads for upload execution;
    uploading, by the sending device and to a receiving server, the a chunk number, the byte buffer array, and the chunk checksum using one HTTP connection of the maximum number of HTTP connections;
    receiving, by the sending device and via a network, a content token returned by the receiving server after the byte buffer array, chunk number, and chunk checksum have been received at the receiving server;
    storing, on the sending device, the received content token along with the chunk number as a pair; and
    determining, on the sending device, whether the total number of file chunks have been uploaded, wherein when the total number of file chunks have been uploaded, the processor passes stored content token and chunk number pairs in an order of chunk number and a computed file checksum to the receiving server for file consolidation.

12. The method of claim 11, wherein the maximum upload chunk size is determined based on at least one of: a network speed, an available bandwidth, or a system memory availability.

13. The method of claim 11, wherein the maximum number of allowable threads is determined based on at least one of: a network speed, an available bandwidth, or a system memory availability.

14. The method of claim 11, wherein the maximum number of HTTP connections is determined based on at least one of: a network speed, an available bandwidth, or a system memory availability.

15. The method of claim 11, wherein the content token is passed to the receiving server in the order of chunk number and a file checksum.

16. The method of claim 11, further comprising computing a file checksum for the file before the configuring, and wherein the checksum is transmitted to the receiving server to determine whether the file already exists on the receiving server and whether file consolidation generates a complete file of reassembled file chunks.

17. The method of claim 11, wherein the passing of the chunk number, the byte buffer array, and the chunk checksum into one thread associated with the maximum number of allowable threads for upload execution occurs a plurality of times in parallel so that each of the maximum number of allowable threads is utilized in parallel.

18. The method of claim 11, wherein the uploading of the a chunk number, the byte buffer array, and the checksum using one HTTP connection of the maximum number of HTTP connections occurs a plurality of times in parallel so that each of the maximum number of HTTP connections is utilized in parallel.

19. The method of claim 11, wherein the maximum number of allowable threads is double the maximum number of available HTTP connections.

20. The method of claim 19, wherein the maximum number of allowable threads includes at least two sets of threads, where one set, of the at least sets, is preparing data for upload while another set, of the at least two sets, is uploading previously prepared data.

* * * * *